Feb. 13, 1934.  H. K. BERGHOLM ET AL  1,946,467
CONDENSER FOR REFRIGERATING APPARATUS
Filed March 14, 1932
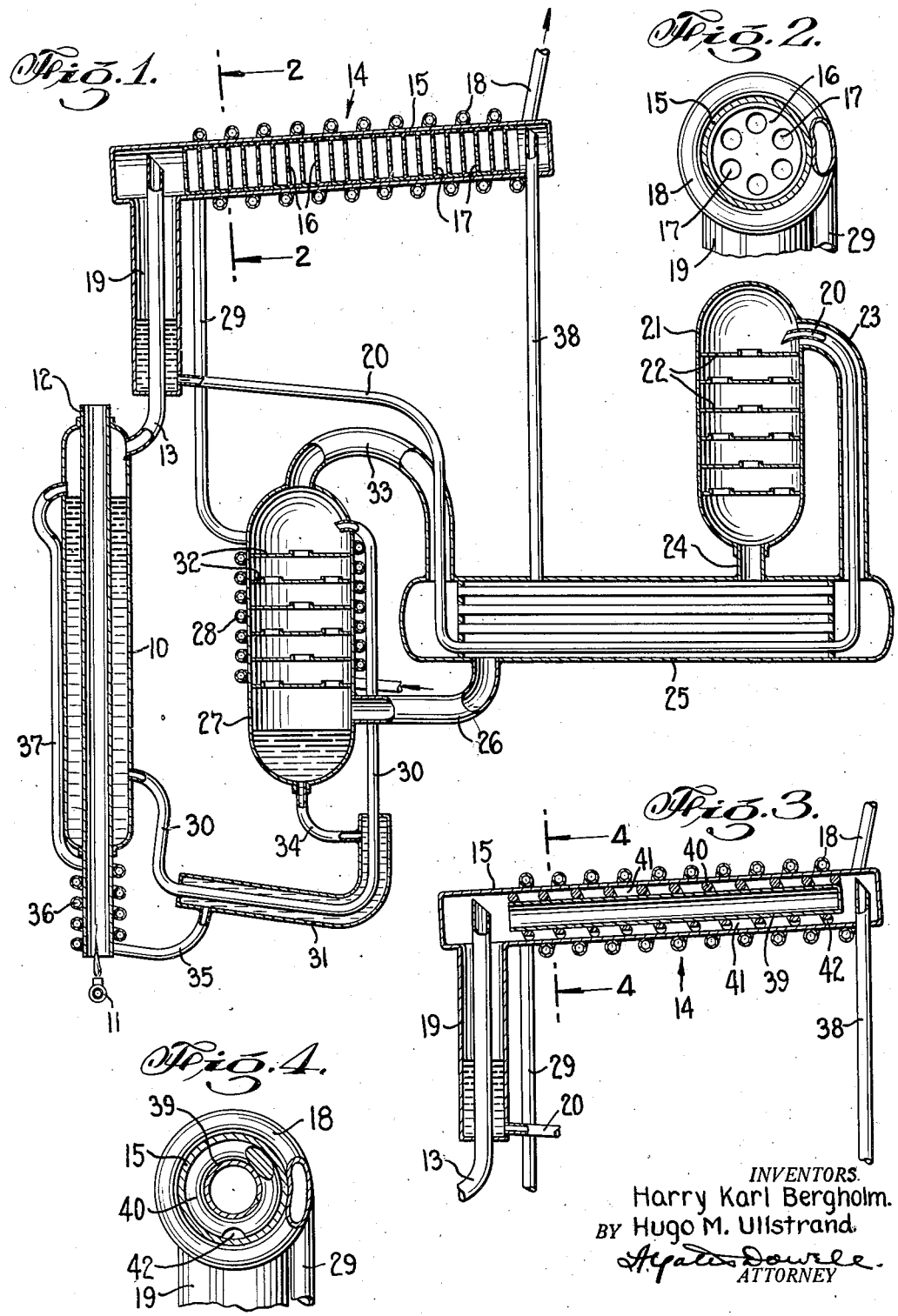
INVENTORS.
Harry Karl Bergholm.
BY Hugo M. Ullstrand.
ATTORNEY Patented Feb. 13, 1934

1,946,467

UNITED STATES PATENT OFFICE 1,946,467

CONDENSER FOR REFRIGERATING APPARATUS

Harry K. Bergholm and Hugo M. Ullstrand, Evansville, Ind., assignors to Electrolux Servel Corporation, New York, N. Y., a corporation of Delaware Application March 14, 1932. Serial No. 598,604

10 Claims. (Cl. 257—28)

This invention relates to heat exchangers and more particularly to condensers. Specifically there is contemplated a condenser and combined rectifier for refrigerating apparatus and the arrangement of such condenser in absorption refrigerating apparatus of the pressure equalized type.

It is an object of this invention to provide a condenser simple in design and construction and in which no liquid trap can form.

Another object of this invention is to provide such a condenser with combined rectifier in an absorption refrigerating apparatus whereby less welding in the assembly of the apparatus is necessary and a more compact and rigid structure results without introducing any factors decreasing the efficiency.

Other objects and advantages will be apparent from the following description taken in connection with the accompanying drawing, in which, Fig. 1 shows a condenser constructed in accordance with this invention and assembled in an absorption refrigerating apparatus of the pressure equalized type;

Fig. 2 is a detail section on line 2—2 in Fig. 1;

Fig. 3 is a vertical section of a modified condenser contemplated by this invention; and Fig. 4 is a section taken on line 4—4 in Fig. 3.

Referring to Fig. 1 of the drawing, the refrigerating apparatus comprises a generator 10 containing a solution of refrigerant in an absorption liquid such as ammonia and water. The generator is heated by a gas burner 11 in a flue 12 which extends vertically through the generator. Ammonia gas expelled from solution by heat in the generator flows upwardly through conduit 13 into the condenser 14.

The condenser is constructed of a closed tubular steel shell 15 within which are arranged a series of spaced baffle plates or discs 16 each provided with apertures 17 adjacent its periphery. A cooling coil 18 is arranged outside of the shell 15 in good thermal relation therewith and is adapted to convey a suitable cooling fluid such as water. Obviously if it is desired that the condenser be air cooled the shell 15 may be provided with heat radiating fins as well known in the art. Preferably the condenser is slightly inclined toward the end into which ammonia gas from the generator is introduced through conduit 13 and at this end is provided with a liquid collecting chamber or well 19 through which conduit 13 from the generator extends upwardly into the condenser.

The ammonia gas entering the condenser is directed by the baffle plates 16 to flow adjacent the outer wall or shell 15 which is cooled by heat exchange with the water in cooling coil 18. Liquid ammonia which forms in the condenser under the required temperature and pressure conditions flows through the lower apertures in the baffle plates 16 and collects in the well 19 around the conduit 13. Due to the temperature of conduit 13 maintained by the liquid ammonia in the well 19 ammonia gas passing through this conduit will be rectified, that is water vapor which may be evolved in the generator and contained in the ammonia gas, condenses out and flows back to the generator.

From the well 19 liquid ammonia flows through a liquid trap over-flow conduit 20 into the upper part of the evaporator 21 where it flows downwardly over baffle plates 22 and evaporates by diffusion into an inert pressure equalizing gas such as hydrogen which also enters the upper part of the evaporator through conduit 23. The resulting gas mixture, which is heavier than the pure hydrogen, flows from the bottom of the evaporator through conduit 24 and passes through the gas heat exchanger 25 and conduit 26 into the lower part of the absorber 27. The absorber is provided with a cooling means such as coil 28 through which flows a suitable cooling fluid such as water for the removal of the heat of absorption. The absorber cooling coil 28 may be connected in series with the condenser cooling coil 18 through conduit 29 as shown.

Weak absorption liquid from which ammonia has been expelled in the generator passes in conduit 30 through the liquid heat exchanger 31 to the upper part of the absorber 27 where it flows downwardly over baffle plates 32 absorbing ammonia out of the gas mixture. The hydrogen which is lighter than the gas mixture flows upwardly through conduit 33, gas heat exchanger 25, and conduit 23 back to the evaporator. Enriched absorption liquid accumulates in the lower part of the absorber from which it passes through conduit 34, liquid heat exchanger 31, and conduit 35 to the heated portion 36 of a thermosiphon conduit 37 in which the liquid is raised into the generator 10 in a well known manner. A vent or pressure equalizing conduit 38 is provided from the gas heat exchanger 25 to the condenser 14 as shown. For a more detailed description of this type of refrigerating apparatus reference may be had to Patent No. 1,609,334, von Platen et al.

As shown in Fig. 3, the construction of condenser 14 may be modified by replacing the perforated baffle discs 16 with a blind tube 39 located concentrically within the outer shell or casing 15 which is spirally wound with a length of solid wire 40. As shown, the tube 39 is closed at one end to prevent flow of gas through the tube whereby the gas is caused to flow adjacent the outer cool casing 15. Obviously the tube 39 may be closed at both ends, made solid, or otherwise closed against flow of gas therethrough. The thickness of the wire is the same as the width of the annular passage formed between the tube 39 and the shell 15, thus forming a spiral passageway 41 through which the gas flows in contact with the outer cooled shell 15. The lower part of each turn is notched to form apertures 42 through which the condensed ammonia may flow back into the collecting chamber or well 19.

It will be obvious to those skilled in the art that various other changes may be made in the construction and arrangement without departing from the spirit of the invention and therefore the invention is not limited to what is shown in the drawing and described in the specification but only as indicated in the appended claims.

We claim:

1. A condenser comprising a substantially horizontally disposed tube closed at each end, a gas inlet and liquid outlet at one end thereof, cooling means on the outside of said tube, and means within said tube to direct the gas in a path of flow adjacent the wall thereof and allow the reverse flow of liquid along the bottom thereof.

2. A condenser comprising a closed container having a liquid collecting well, a gas inlet conduit extending in thermal exchange relation with said well, means for cooling said container, and means within said container for directing the gas in a path of flow adjacent the walls thereof.

3. A condenser comprising an elongated closed shell having gas inlet and liquid outlet connections at one end thereof, means for cooling said shell, and a plurality of partitions in said shell perforated adjacent their peripheries.

4. A condenser comprising a closed tubular shell having gas inlet and liquid outlet connections at one end thereof, cooling means for said shell, and a plurality of spaced discs in said shell containing openings adjacent their peripheries.

5. A condenser comprising a slightly inclined closed tubular shell, a liquid collecting well at the lower end of said shell, a gas inlet conduit extending in thermal exchange relation with said well, means for cooling said shell, and a plurality of discs partitioning said shell and having openings adjacent their peripheries.

6. A condenser comprising a slightly inclined outer closed tubular shell having a liquid collecting well at its lower end, a gas inlet conduit extending in thermal exchange relation with said well, cooling means for said outer shell, a closed tube located concentrically within said outer shell forming therewith an annular passageway, and a helix in said passageway for directing the gas in a spiral path of flow therethrough, each turn of said helix being notched at its lowermost portion to allow the return flow of condensate along the bottom.

7. In absorption refrigerating apparatus of the pressure equalized type, a condenser comprising a slightly inclined closed tubular shell, a liquid collecting well at the lower end of said shell, cooling means for said shell, and a plurality of discs partitioning said shell and having openings adjacent their peripheries, a conduit for gas extending upwardly through said well into the lower end of the condenser and a liquid trap overflow outlet for liquid from said well.

8. In absorption refrigerating apparatus of the pressure equalized type, a condenser comprising a slightly inclined closed tubular shell having a liquid collecting well at its lower end, cooling means for said shell, and means within said shell for directing gas in a spiral path of flow adjacent the cooled wall and allowing the return flow of condensate along the bottom, a conduit for gas extending upwardly through said well into the lower end of the condenser and a liquid trap overflow outlet for liquid from said well.

9. In refrigerating apparatus of the absorption type, a condenser comprising a horizontally elongated closed container having a liquid collecting chamber at one end thereof, means for cooling said container, and means within said container to direct gas in a path of flow adjacent the walls and allow the reverse flow of liquid along the bottom thereof, a conduit for gas to the condenser passing upwardly through said well and a liquid trap overflow outlet for liquid refrigerant from said well.

10. A condenser comprising a substantially horizontal closed tube, gas inlet and liquid outlet means at one end of said tube, cooling means on the outside of said tube, and means within said tube to direct gas in a path of flow adjacent the wall thereof, said flow directing means and said tube being formed and cooperating in a manner to allow flow of liquid along the bottom of said tube.

HARRY K. BERGHOLM.
HUGO M. ULLSTRAND.